Aug. 1, 1933.   G. RAMONDETTA   1,920,216
AUTOMATIC VEHICLE JACK
Filed May 14, 1930   2 Sheets-Sheet 2
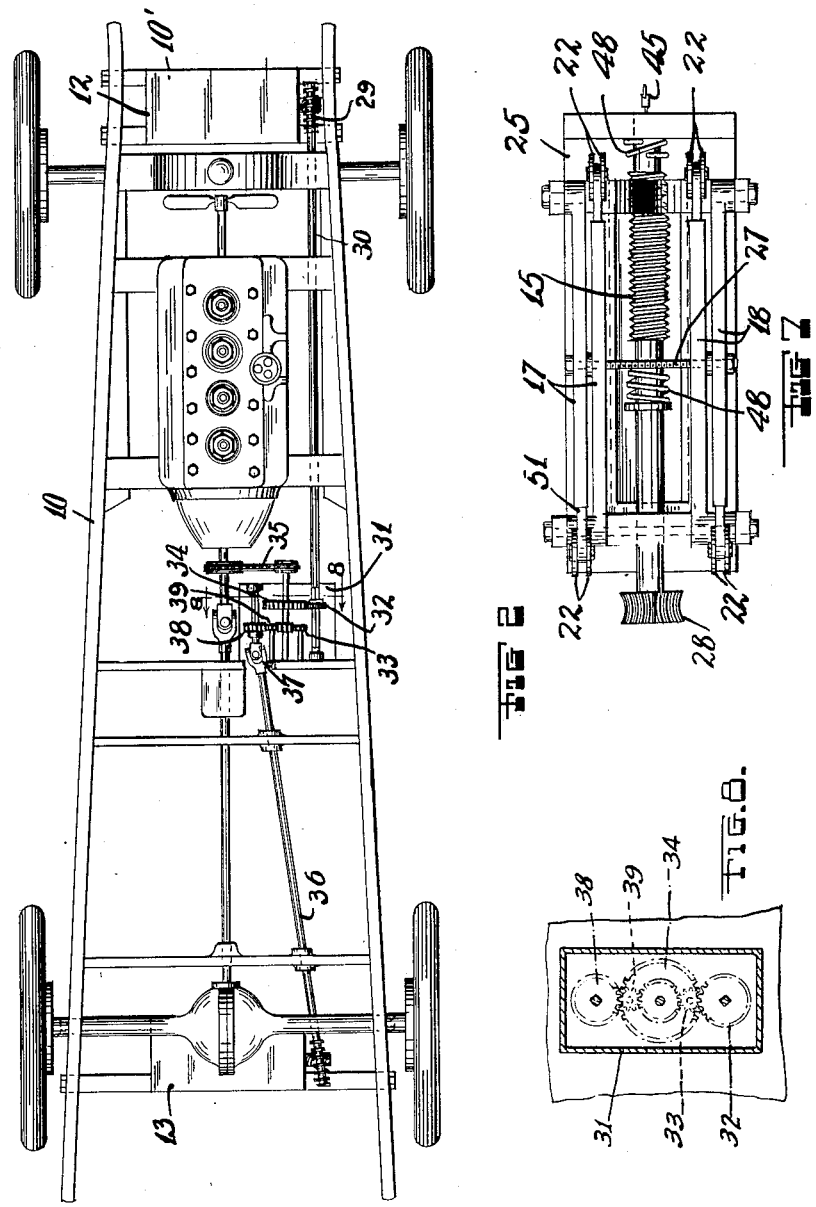
INVENTOR
Gaetano Ramondetta
BY
ATTORNEY Patented Aug. 1, 1933

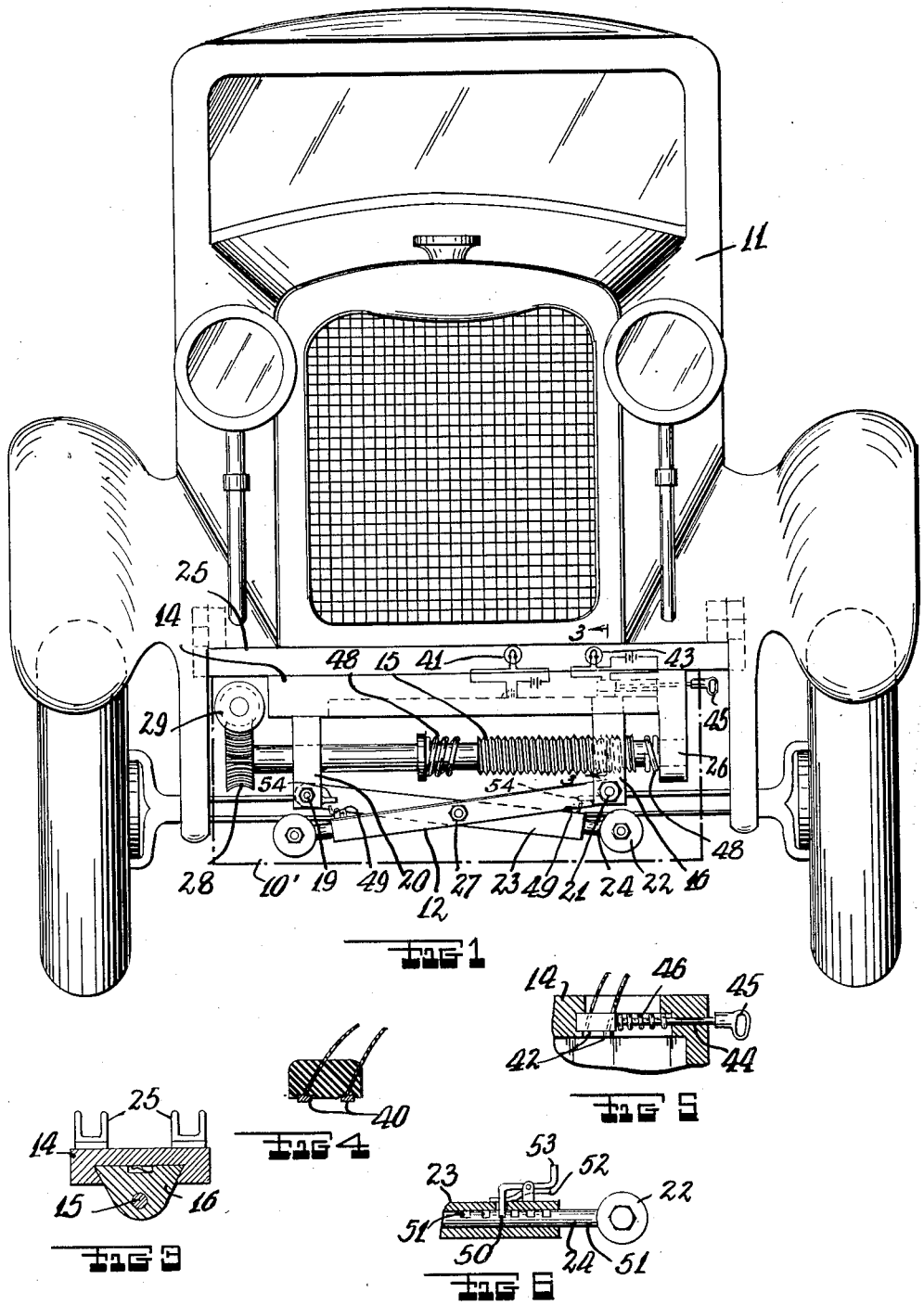

1,920,216

UNITED STATES PATENT OFFICE

1,920,216

AUTOMATIC VEHICLE JACK

Gaetano Ramondetta, New York, N. Y., assignor of ten per cent to Thomas Pupillo, ten per cent to Giovanno Lopizzo, ten per cent to Anthony Seta, thirty per cent to Sebastiano Costanzo, and ten per cent to Sebastiano Riebera, all of New York, N. Y.

Application May 14, 1930. Serial No. 452,239

4 Claims. (Cl. 254—126.)

This invention relates to new and useful improvements in an automobile jack.

The invention has for an object the provision of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a front elevational view of a motor vehicle provided with a jack constructed according to this invention.

Fig. 2 is a plan view of the chassis of the motor vehicle shown in Fig. 1.

Fig. 3 is an enlarged vertical sectional view taken on the line 3—3 of Fig. 1.

Fig. 4 is an enlarged sectional detailed view of a portion of Fig. 1.

Fig. 5 is an enlarged fragmentary sectional detailed view of another portion of Fig. 1.

Fig. 6 is a fragmentary detailed view of one of the cross rods shown in Fig. 1.

Fig. 7 is a bottom elevational view of one of the jacks, per se.

Fig. 8 is an enlarged fragmentary sectional view taken along the line 8—8 of Fig. 2.

It is intended that the automobile jacks be used in combination with the chassis 10 of a motor vehicle 11, and consist of a jack 12 attached on the front of the chassis and another jack 13 attached on the rear and each of said jacks comprising a transverse member 14, a screw 15 rotatively supported on said transverse member 14, a follower 16 slidably mounted on said member 14 and threadedly engaging the screw 15, pairs of spaced pivoted cross rods 17 and 18 each pair having one top end 19 pivotally mounted on a stationary member 20 attached on the transverse member 14 and the other top end 21 pivotally mounted on said follower 16, rollers 22 on the bottom of said rods, said rods being of telescoping sections 23 and 24, means for rotating the screw 15 in one or the other direction by connection of the motor of the vehicle 11 to cause said rods 17, 18 to extend or to assume normally folded condition or an extreme folded condition, and means for latching the sections 23, 24 of said rods in adjusted positions in said extended or folded condition and automatically unlatching said sections for new adjustments in said extreme folded condition. The working mechanism is covered by a safety shield plate 10'.

The transverse member 14 is supported by a pair of metallic straps 25 onto the chassis 10. The rotative supporting of the screw 15 is accomplished by spaced standards 20 and 26. The slidable mounting of the follower 16 upon the transverse member 14 is accomplished by a dovetailed arrangement as may be seen from an inspection of Fig. 3. Each of the jacks 12, 13 is shown provided with two pairs of the pivoted cross rods indicated by reference numeral 17 and 18. The pivoting of these cross rods is accomplished intermediate of their ends as indicated by reference numeral 27.

As shown on the drawings, the rod sections 24 are the bottom ones and the sections 23 the top ones. It is the sections 23 which are pivotally connected at 27. The sections 24 are slidably engaged within the sections 23 so as to be extendable to various distances. The means for rotating the screw 15 as before recited consists of a worm wheel 28 fixed upon the screw and meshing with a worm pinion 29. The front jack 12 is shown provided with a transmission shaft 30 supporting the said worm pinion 29 and extending into a gear box 31 and carrying a gear 32 slidably mounted on a square portion of the shaft. A conventional shift stick may be provided for shifting the gear 32, but such stick is not shown on the drawings since such sticks are generally known. The gear 32 may be moved so as to engage with a gear 33 rotating in one direction on a shaft, or a gear 34 rotating in the opposite direction on a shaft and said gears receive their rotations from a chain 35 connected with the motor of the vehicle.

The worm pinion 29 of the rear jack 13 is fixed upon a transmission shaft 36 also extending into the gear box 31. A universal joint 37 is shown interposed between the ends of the shaft 36. A gear 38 is slidably mounted upon the portion of the shaft within the box 31 and is intended for engagement by a shifting stick so as to be movable to either mesh with a gear 39 connected for rotating in one direction or mesh with the gear 34 connected for rotating in the opposite direction, or to assume a neutral position.

Signal circuits are also provided for indicating to the operator of the device when the rods assume the extended position or when they assume the normally folded position or the extreme folded position. These circuits are shown to consist of a pair of contacts 40 positioned on the member 14 and connected in a circuit which includes a signal lamp 41. The position of the contacts 40 are such that when the follower 16 reaches a position in which the cross rods are fully extended the circuit is closed across the contacts 40 for lighting the lamp 41. The operator then knows that the fully extended position has been reached and moves his shift to disconnect the screw 15, preventing further rotating thereof.

Another pair of contacts 42 are arranged upon the member 14 also in the path of motion of the follower 16, but so located that the circuit is closed across these contacts when the crossed rods 17 and 18 are in the normally folded positions. The contacts 42 are connected in a circuit which includes a signal lamp 43 to indicate to the operator when this condition of the rods has been reached. For reaching the extremely folded condition, it is necessary that the contacts 42 be shifted so that the circuit to the lamp 43 is closed by the follower 16 in another position in which such extremely folded position of the cross rods exists. For this reason a rod 44 is attached upon a block supporting the contacts 42 and terminates in a handle 45 for manual manipulation. A spring 46 acts between the block holding the contacts 42 and some stationary part for normally urging the block into the position first mentioned.

The screw 15 has non-threaded portions so that if the follower 16 moves too far one way or the other it merely moves off the threads and then the screw is free to idle without any damage being done to the apparatus. Springs 48 are arranged upon the non-threaded portions of the screws so as to normally tend to urge the follower 16 back into engagement with the screws for insuring threaded engagements of these parts when the rotation of the screw is reversed. The means for latching the sections of the rods in adjusted positions in extended or folded condition of the cross rods and automatically unlatching these sections for new adjustments in said extreme folded conditions consists of a finger 49 pivotally mounted intermediate of its ends upon each of the sections 23 and arranged so that its front end 50 is adapted to engage in rack teeth 51 formed in the sections 24. A very strong spring 52 normally urges the front of the finger into engagement with the rack. The rear end of the finger 53 is engageable against stationary projections 54 when the crossed rods assume the extreme folded position so as to cause the fingers to be pivoted into inoperative positions.

The operation of the device may be followed by assuming that the jacks are in the normally folded condition. When it is necessary to jack up the front or the rear of the vehicle the shift stick is moved for connecting the proper gear to transmit rotations from the motor of the vehicle to the jack. These rotations cause the screw 15 of the particular jack to turn in one direction. The follower then moves along on the screw and the car is lifted. When the follower 16 reaches the position to close the circuits across contacts the lamp 41 lights, signaling to the operator that the cross rods of the jack have been fully extended so that he may move the particular gear which connects the transmission shaft of the particular rack with the motor of the vehicle to the neutral position.

When it becomes necessary to lower the raised portion of the vehicle and move the jack back into its original condition, the shift is moved to cause the proper rotation of the shaft 15. Now the follower 16 moves in the opposite direction and upon reaching the contacts 42 signals by the lamp 43 for the operator to discontinue further rotation of the shaft 15. In the event that the operator wishes to extend the rod sections 24 so as to change the moment arms of the wheels 22 relative to the pivot point 27 as may be necessary when the motor vehicle carries different loads, it is merely necessary to manually move the handle 45 so as to move the contacts 42 to a position to the extreme right as permitted by the spring 46 in Fig. 5. Then rotation of the shaft 15 may be continued until the signal lamp 43 indicates the extreme folded position of the cross rods. In this extreme folded position the free ends 53 of the pivoted fingers 49 engage against the projections 54 so that the front ends 50 disengage from the rack teeth 51. The sections 24 may then be manually moved to new adjusted positions. Then the screw 15 may be rotated in the opposite direction for causing the follower 16 to assume the position in which the cross rods are in their normally folded condition and now the device is in its original phase.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with the chassis of a motor vehicle, a jack attached on the front and rear thereof, each comprising a transverse member, a screw rotatively supported thereon, a follower slidably mounted on said member and threadedly engaging said screw, a stationary member fixed upon said transverse member, pairs of spaced pivoted cross rods each pair having one top end pivotally mounted on the stationary member and the other top end pivotally mounted on said follower, rollers on the bottom of said rods, said rods being of telescoping sections, means for rotating said screw in one or the other direction by connection with the motor of said vehicle to cause said rods to extend or assume a normally folded condition or an extreme folded condition, and means for latching the sections of said rods in adjusted positions in said extended or folded condition and automatically unlatching said sections for new adjustments in said extreme folded condition.

2. In combination with the chassis of a motor vehicle, a jack attached on the front and rear thereof, each comprising a transverse member, a screw rotatively supported thereon, a follower slidably mounted on said member and threadedly engaging said screw, a stationary member fixed upon said transverse member, pairs of spaced pivoted cross rods each pair having one top end pivotally mounted on the stationary member and the other top end pivotally mounted on said follower, rollers on the bottom of said rods, said rods being of telescoping sections, means for rotating said screw in one or the other direction by connection with the motor of said vehicle to cause said rods to extend or assume a normally folded condition or an extreme folded condition, and means for latching the sections of said rods in adjusted positions in said extended or folded condition and automatically unlatching said sections for new adjustments in said extreme folded condition, said cross rods being pivoted intermediate of their ends and on the upper telescoping sections.

3. In combination with the chassis of a motor vehicle, a jack attached on the front and rear thereof, each comprising a transverse member, a screw rotatively supported thereon, a follower slidably mounted on said member and threadedly engaging said screw, a stationary member fixed upon said transverse member, pairs of spaced pivoted cross rods each pair having one top end pivotally mounted on the stationary member and the other top end pivotally mounted on said follower, rollers on the bottom of said rods, said rods being of telescoping sections, means for rotating said screw in one or the other direction by connection with the motor of said vehicle to cause said rods to extend or assume a normally folded condition or an extreme folded condition, and means for latching the sections of said rods in adjusted positions in said extended or folded condition and automatically unlatching said sections for new adjustments in said extreme folded condition, said means for rotating said screw in one or the other direction comprising a gear box, a shift stick controlling said gear box, a transmission shaft connected with said gear box, a worm pinion mounted on said transmission shaft, and a worm wheel attached upon the screw and meshing with said worm pinion.

4. In combination with the chassis of a motor vehicle, a jack attached on the front and rear thereof, each comprising a transverse member, a screw rotatively supported thereon, a follower slidably mounted on said member and threadedly engaging said screw, a stationary member fixed upon said transverse member, pairs of spaced pivoted cross rods each pair having one top end pivotally mounted on the stationary member and the other top end pivotally mounted on said follower, rollers on the bottom of said rods, said rods being of telescoping sections, means for rotating said screw in one or the other direction by connection with the motor of said vehicle to cause said rods to extend or assume a normally folded condition or an extreme folded condition, and means for latching the sections of said rods in adjusted positions in said extended or folded condition and automatically unlatching said sections for new adjustments in said extreme folded condition, comprising a finger pivotally mounted intermediate of its ends on one of the sections, rack teeth formed in the other of said sections means for urging the front end of said finger into said rack teeth, and stationary members for abutting against the rear end of said pivoted fingers in the extreme folded condition of said cross rods for lifting the front ends of the fingers out of the rack teeth.

GAETANO RAMONDETTA.